(12) United States Patent
Nanda

(10) Patent No.: US 11,359,814 B2
(45) Date of Patent: Jun. 14, 2022

(54) CMC CROSS-OVER TUBE

(71) Applicant: Rolls-Royce High Temperature Composites Inc., Cypress, CA (US)

(72) Inventor: Sujit Nanda, Huntington Beach, CA (US)

(73) Assignee: ROLLS-ROYCE HIGH TEMPERATURE COMPOSITES INC., Huntington Beach, CA (US)

( * ) Notice: Subject to any disclaimer, the term of this patent is extended or adjusted under 35 U.S.C. 154(b) by 0 days.

(21) Appl. No.: 16/786,475

(22) Filed: Feb. 10, 2020

(65) Prior Publication Data

US 2020/0182472 A1    Jun. 11, 2020

Related U.S. Application Data

(62) Division of application No. 14/839,260, filed on Aug. 28, 2015, now abandoned.

(51) Int. Cl.
*F23R 3/48* (2006.01)
*F16L 49/04* (2006.01)

(52) U.S. Cl.
CPC ............... *F23R 3/48* (2013.01); *F16L 49/04* (2013.01)

(58) Field of Classification Search
CPC .. F23R 3/48; F23R 3/007; F16L 49/04; F05D 2300/6033
See application file for complete search history.

(56) References Cited

U.S. PATENT DOCUMENTS

| | | | | |
|---|---|---|---|---|
| 2,437,385 A | * | 3/1948 | Halford | F23R 3/48 285/121.1 |
| 2,540,642 A | * | 2/1951 | Allen | F02C 7/264 60/786 |
| 2,679,136 A | * | 5/1954 | Gaubatz | F23R 3/48 60/800 |
| 2,729,938 A | | 1/1956 | McDowall et al. | |
| 2,832,195 A | | 4/1958 | Weissborn, Jr. | |
| 2,979,898 A | | 4/1961 | Ward | |
| 3,001,366 A | * | 9/1961 | Shutts | F23R 3/48 60/39.821 |
| 3,184,918 A | | 5/1965 | Mulcahey | |
| 3,721,089 A | | 3/1973 | Morrison et al. | |
| 3,778,256 A | | 12/1973 | Sasaki | |
| 3,811,274 A | | 5/1974 | Calderon | |
| 3,991,560 A | | 11/1976 | DeCorso et al. | |

(Continued)

FOREIGN PATENT DOCUMENTS

| | | |
|---|---|---|
| EP | 2955447 A1 | 12/2015 |
| GB | 578010 A | 6/1946 |
| GB | 802924 A | 10/1958 |

*Primary Examiner* — Thomas P Burke
(74) *Attorney, Agent, or Firm* — Crowell & Moring LLP

(57) ABSTRACT

A fluid conduit may be provided comprising a ceramic matrix composite (CMC) cross-over tube and a flange. The CMC cross-over tube may comprise a first end configured to extend into a first combustor liner of a gas turbine engine, and a second end configured to extend into a second combustor liner of a gas turbine engine. The interior of the CMC cross-over tube may define a passageway. The flange may extend outwardly from an outer surface of the CMC cross-over tube. The flange may be configured to engage at least one of the first combustor liner and the second combustor liner.

12 Claims, 4 Drawing Sheets

(56) References Cited

U.S. PATENT DOCUMENTS

| | | | |
|---|---|---|---|
| 5,001,896 A * | 3/1991 | Hilt | F23R 3/48 |
| | | | 60/39.821 |
| 5,402,635 A | 4/1995 | Smith et al. | |
| 5,609,031 A | 3/1997 | Jones | |
| 6,732,532 B2 | 5/2004 | Camy | |
| 7,836,677 B2 | 11/2010 | Bland | |
| 7,870,738 B2 | 1/2011 | Zborovsky et al. | |
| 2007/0122266 A1 | 5/2007 | Cairo | |
| 2013/0251939 A1* | 9/2013 | Kleinow | F01D 5/284 |
| | | | 428/121 |
| 2014/0366505 A1 | 12/2014 | Prociw et al. | |
| 2015/0000287 A1 | 1/2015 | Woerz | |
| 2015/0060025 A1 | 3/2015 | Schaeffer | |
| 2016/0010868 A1* | 1/2016 | Pinnick | F23R 3/60 |
| | | | 60/722 |

* cited by examiner

CMC CROSS-OVER TUBE

CROSS-REFERENCE TO RELATED APPLICATION(S)

This application is a divisional application of co-pending U.S. Non-Provisional application Ser. No. 14/839,260, filed Aug. 28, 2015. The contents of U.S. Non-Provisional application Ser. No. 14/839,260 are incorporated by reference in their entirety.

TECHNICAL FIELD

This disclosure relates to cross-over tubes for combustors for use in turbine engines and, in particular, to ceramic matrix composite (CMC) cross-over tubes for combustors.

BACKGROUND

The statements in this section merely provide background information related to the present disclosure and may not constitute prior art.

In can annular combustors, a cross-over tube may be placed between two cans to allow ignition gases to pass from one can to another. In this way, cross-ignition between the cans may be achieved allowing for more reliable combustion. However, cross-over tubes may be more vulnerable to structural failure than other combustor components due to excessive thermal loading. Therefore, a cross-over tube which may better withstand thermal loading is desirable.

SUMMARY

Further areas of applicability will become apparent from the description provided herein. It should be understood that the description and specific examples are intended for purposes of illustration only and are not intended to limit the scope of the present disclosure.

In one embodiment, a fluid conduit may be provided comprising a ceramic matrix composite (CMC) cross-over tube and a flange. The CMC cross-over tube comprises a first end configured to extend into a first combustor liner of a gas turbine engine, and a second end configured to extend into a second combustor liner of a gas turbine engine. The interior of the CMC cross-over tube defines a passageway. The flange extends outwardly from an outer surface of the CMC cross-over tube. The flange is configured to engage at least one of the first combustor liner and the second combustor liner.

In another embodiment, a combustor system may be provided comprising a combustion chamber and a CMC cross-over tube and a flange. The combustion chamber comprises a combustor liner. The CMC cross-over tube has a first end and a second end, the first end extending into the combustion chamber through the combustor liner. An interior of the CMC cross-over tube defines a passageway extending from the first end to the second end. The flange extends radially from the CMC cross-over tube between the first end and the second end. The flange is configured to engage the combustor liner.

In yet another embodiment, a method of manufacturing a fluid conduit may be provided comprising providing a porous ceramic preform in the shape of a tube and forming the ceramic preform into a CMC cross-over tube. The CMC cross-over tube comprises a first end configured to extend into a first combustion chamber and a second end configured to extend into a second combustion chamber. An inner surface of the CMC cross-over tube defines a passageway configured to allow fluid communication between the first combustion chamber and the second combustion chamber.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In one example, a fluid conduit is provided comprising a ceramic matrix composite (CMC) cross-over tube and a flange. The CMC cross-over tube comprises a first end configured to extend into a first combustor liner of a gas turbine engine and a second end configured to extend into a second combustor liner of the gas turbine engine. An interior surface of the CMC cross-over tube defines a passageway. The flange extends outwardly from an outer surface of the CMC cross-over tube. The flange is configured to engage at least one of the first combustor liner and the second combustor liner.

One technical advantage of the systems and methods described below may be that the CMC cross-over tube described below may be used within a can annular combustor at a higher temperature than other cross-over tubes. Another technical advantage of the systems and methods described below may be that the CMC cross-over tube described below may be more durable under sustained thermal loading than other cross-over tubes. Yet another technical advantage of the systems and methods described may be that the CMC cross-over tube may be lighter than other cross-over tubes.

Figure 1:
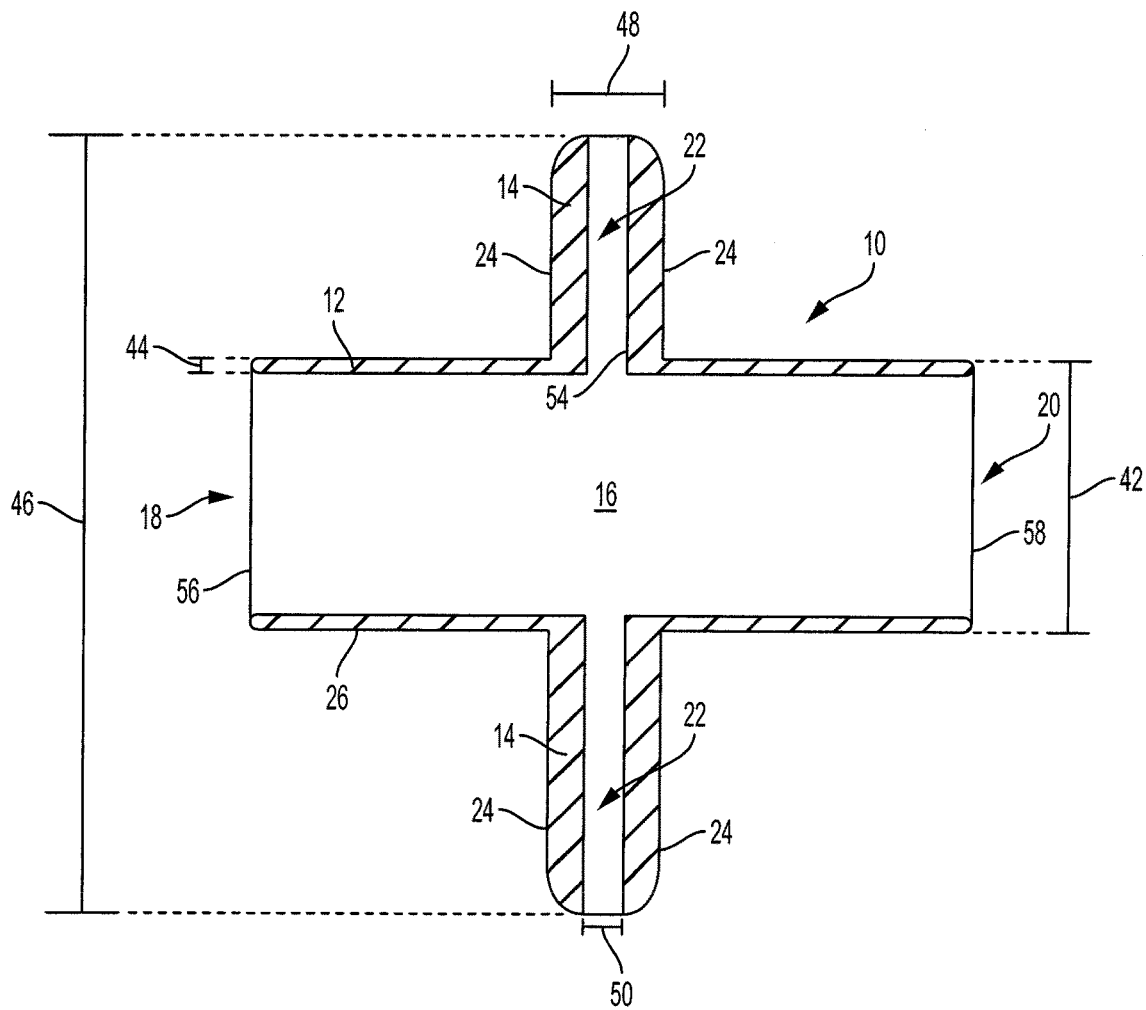
FIG. 1 illustrates a cross-sectional view of a first example of a fluid conduit comprising a CMC cross-over tube and a flange.

FIG. 1 illustrates a cross-sectional view of a first example of a fluid conduit 10 comprising the CMC cross-over tube 12 and the flange 14. The CMC cross-over tube 12 may be any object which defines a passageway 16 allowing gas to travel between at least two combustion chambers (see combustion chambers 38 in FIG. 5). Examples of the CMC cross-over tube 12 may include a tube, a pipe, or a porous wall dividing the combustion chambers 38. The CMC cross-over tube 12 may be made from any ceramic matrix composite with sufficient thermal properties such as a Silicon Carbide/ Silicon Carbide composite or an Aluminum Oxide/Aluminum Oxide Composite. The CMC cross-over tube 12 may have a diameter 42 between 0.5 inches and 3 inches. The thickness 44 of the CMC cross-over tube 12 may be between 0.03 inches and 0.3 inches.

As shown in FIG. 1, the passageway 16 may extend along the entire length of the CMC cross-over tube 12. Fluid may flow in and out of the passageway 16 through a first opening 18 and a second opening 20. The first opening 18 is defined by the first end 56 of the CMC cross-over tube 12, and the second opening 20 is defined by the second end 58 of the CMC cross-over tube 12. The CMC cross-over tube 12 may be positioned relative to the combustion chambers 38 so that the openings 18, 20 of the CMC cross-over tube may each be positioned within a corresponding one of the combustion chambers 38. In such a configuration, ignited fluid may pass from an ignited combustion chamber to an unignited combustion chamber. The ignited combustion chamber may be one of the combustion chambers 38 in which a combustible fluid has been ignited. The unignited combustion chamber may be one of the combustion chambers 38 in which un-ignited fluid has not been ignited.

The flange 14 may be any object or portion of the CMC cross-over tube 12 which extends outwardly from the outer surface 26 of the CMC cross-over tube 12. For example, the flange 14 may be circular object forming a continuous ring about the CMC cross-over tube 12. Alternatively, the flange 14 may be a partial ring encircling a portion of the CMC cross-over tube 12. Alternatively, the flange 14 may be a plurality of fingers extending radially from the outer surface 26 of the CMC cross-over tube 12. The flange 14 may be made of a metal alloy, such as a nickel super alloy. Alternatively, the flange 14 may be made from a CMC material, such as the CMC material in the CMC cross-over tube 12. In some examples, the CMC cross-over tube 12 and the flange 14 may be a single CMC element. The flange 14 may have an outer diameter 46 between 0.7 inches and 4.25 inches. A ratio between the outer diameter 46 of the flange 14 over the diameter 42 of the CMC cross-over tube 12 may be between 1.4 and 1.8. The flange 14 may also have a width 48 between 0.3 inches and 0.5 inches. The ratio of the outer diameter 46 of the flange 14 over the width 48 of the flange 14 may be between 2.3 and 8.5.

The flange 14 may be positioned anywhere along the outer surface 26 of the CMC cross-over tube 12, in other words, anywhere from the first end 56 to the second end 58 of the cross-over tube 12. Where the flange 14 is configured to engage with one combustor liner (see the combustor liners 34 in FIG. 4), the fluid conduit 10 may comprise multiple flanges 14, each flange 14 being positioned in proximity to a respective one of the first and second ends 56, 58 of the CMC cross-over tube 12. Where the flange 14 is configured to engage with two combustor liners 34, one on each side of the flange 14, the flange 14 be positioned at or proximate to a midpoint between the first and second ends 56, 58 of the CMC cross-over tube 12, as shown in FIG. 1.

Figure 2:
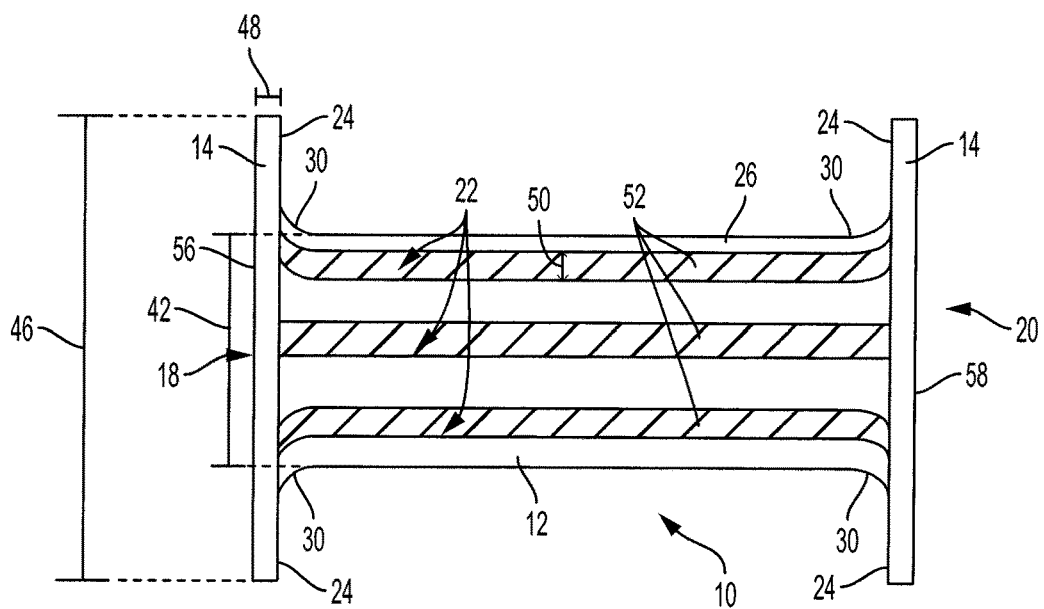
FIG. 2 illustrates a side plan view of a second example of a fluid conduit comprising a CMC cross-over tube and flanges.
Figure 3:
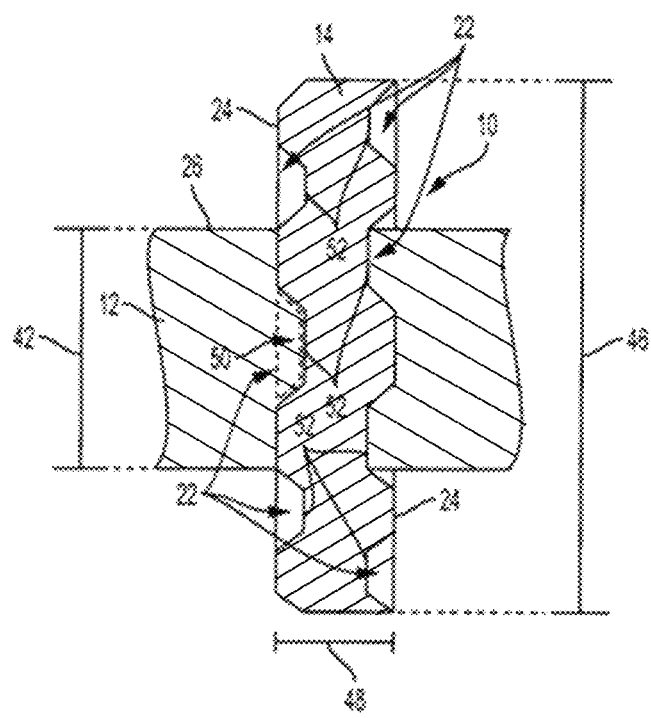
FIG. 3 illustrates a top plan view of a third example of a fluid conduit comprising a CMC cross-over tube and a flange.

The fluid conduit 10 may further comprise the channels 22 configured to facilitate fluid flow to the CMC cross-over tube 12. Cooling fluid may flow through the channels 22 to cool the CMC cross-over tube 12, and may prevent structural failure caused by excessive thermal loading. The channels 22 may be located on or in the flange 14, as shown in FIGS. 1 and 3. Alternatively or in addition, the channels 22 may be located on the outer surface 26 of the CMC cross-over tube 12 as shown in FIG. 2. The channels 22 may be spaced about the circumference of the flange 14. The channels 22 may be defined by grooves 52 in the outer surface 26 of the CMC cross-over tube 12, grooves 52 in the engagement surfaces 24 of the flange 14, or grooves 52 in an inner surface 54 in the interior of the flange 14. The dimensions of the channel 22 may vary depending on the diameter 42 and the thickness 44 of the CMC cross-over tube 12. The channels 22 may have a combined total cross-sectional area 50 between 0.01 square inches and 0.07 square inches.

As demonstrated by the embodiment shown in FIG. 1, the channels 22 may be defined by the inner surface 54 within the interior of the flange 14. The channels 22 may extend from an outer edge of the flange 14 to the passageway 16 within the CMC cross-over tube 12. In some embodiments, the channels 22 may not be in fluid communication with the passageway 16. Alternatively, the channels 22 may instead extend from the outer edge of the flange 14 to the outer surface 26 of the CMC cross-over tube 12.

The flange 14 may include the engagement surface 24 configured to engage an opposing surface (see the opposing surface 60 in FIG. 4) of at least one combustor liner 34 for a combustion chamber 38. Examples of engagement between the engagement surface 24 and the opposing surface 60 may be planar contact between the two surfaces 24, 60, partial contact between a portion of each of the two surfaces 24, 60, a seal between the two surfaces 24, 60, or a degree of freedom of movement of at least one of the two surfaces 24, 60, such that the two surfaces 24, 60 may contact one another. The engagement surface 24 may be shaped to match an opposing surface 60 of the combustor liner 34. Furthermore, the flange 14 may comprise a plurality of engagement surfaces 24 to engage multiple opposing surfaces 60 on combustor liners 34. For example, FIG. 1 illustrates the engagement surfaces 24 on each vertical side of the flange 14.

FIG. 1 illustrates an embodiment of the engagement surface 24 which is flat and perpendicular to the outer surface 26 of the CMC cross-over tube 12. Such a configuration may limit the longitudinal motion of the fluid conduit 10 in an axial direction that runs from the first end 56 of the CMC cross-over tube 12 to the second end 58 along the outer surface 26 of the CMC cross-over tube 12 and still allow some lateral movement perpendicular to the outer surface 26 of the CMC cross-over tube 12. However, the engagement surface 24 may be positioned to extend at an acute or obtuse angle with respect to the outer surface 26 of the CMC cross-over tube 12 to restrict all movement of the fluid conduit 10 with respect to the engaged combustor liners 34. Alternatively, the engagement surface 24 may be curved to match the curved opposing surface 60 on a combustor liner 34.

FIG. 2 illustrates an embodiment of the fluid conduit 10 comprising two flanges 14 located near the first end 56 and second end 58 of the CMC cross-over tube 12. The flanges 14 in the embodiment shown may be configured to be placed within the combustion chamber 38, with the combustor liners 34 extending over a portion of the outer surface 26 of the CMC cross-over tube 12. The flanges 14 may each comprise inward facing engagement surfaces 24 arranged on the outer surface of the flange and facing the midpoint of the CMC cross-over tube 12. In such an embodiment, the opposing surface 60 on the combustor liner 34 may be received against the engagement surface of the flange 14.

The CMC cross-over tube 12 may comprise grooves in the outer surface 26 defining channels 22 arranged longitudinally along the length of the CMC cross-over tube 12. In such an embodiment, cooling fluid may enter the channels 22 near the midpoint of the CMC cross-over tube 12, where the outer surface 26 is not overlapped by the combustor liner 34. The cooling fluid may travel through the channels 22 from the midpoint to the first and second ends 56, 58 of the CMC cross-over tube 12. At or near the first and second ends 56, 58, the cooling fluid may continue to flow in the channels 22 on the engagement surfaces 24 of the flanges 14, or may pass through holes in the flanges 14 into the combustion chamber 38.

The embodiment shown in FIG. 2 further comprises a curved element 30 extending between the outer surface 26 of the CMC cross-over tube 12 and each of the flanges 14. The curved element 30 may provide structural support between the CMC cross-over tube 12 and the flange 14. Furthermore, the curved element 30 may provide a path for cooling fluid to move between the channels 22 arranged on the outer surface 26 of the CMC cross-over tube 12 and the channels 22 arranged on the engagement surfaces 24 of the flanges 14. The curved elements 30 may not be curved, but instead be shaped in some other way to provide a gradual transition between the CMC cross-over tube 12 and the flange 14, such as a linear transition or a series of linear transitions.

FIG. 3 illustrates an embodiment of the fluid conduit 10 comprising the flange 14 arranged between the first and second ends 56, 58 (not shown) of the CMC cross-over tube 12. The flange 14 may comprise the engagement surfaces 24 on opposite sides of the flange 14, in other words, a first one of the engagement surfaces 24 may be opposite a second one of the engagement surfaces 24. Furthermore, each engagement surface 24 may comprise a plurality of grooves 52 extending outwardly from the outer surface 26 of the CMC cross-over tube 12 and spaced about the circumference of the flange 14. To ensure more efficient cooling of the CMC cross-over tube 12 and flange 14, the grooves 52 on the first one of the engagement surfaces 24 may be angularly offset from the grooves 52 on the second one of the engagement surfaces 24 that is opposite the first one of the engagement surfaces 24. This configuration may ensure that the none of the channels 22 defined by the grooves 52 on the first engagement surface 24 overlap with any of the channels 22 on the opposite second engagement surface 24. Each of the channels 22 on the flange 14 may be configured to feed cooling fluid to a corresponding channel 22 on the outer surface 26 of the CMC cross-over tube 12.

Figure 4:
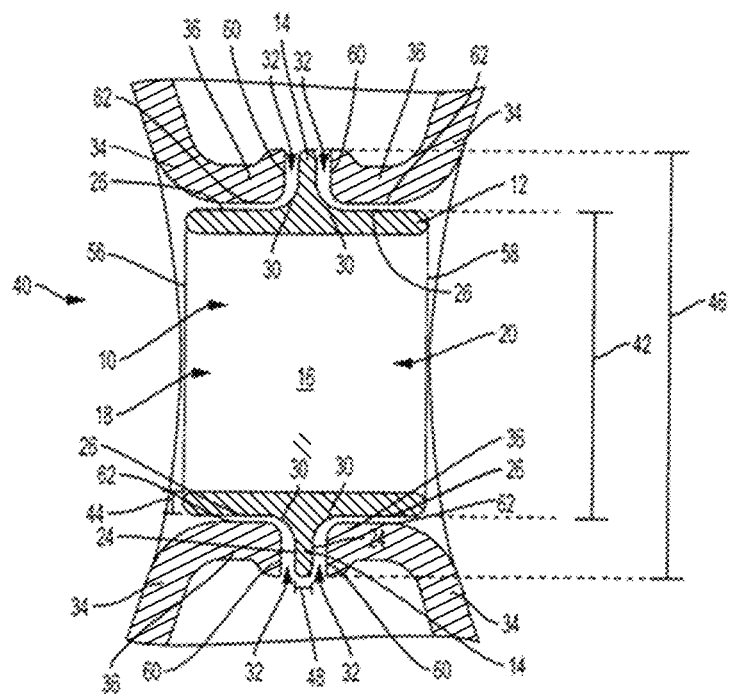
FIG. 4 illustrates a cross-sectional view of an example of a portion of a combustor, including a CMC cross-over tube and combustion chambers.

FIG. 4 illustrates a combustor system 40 comprising the fluid conduit 10 positioned between two combustion chambers 38. Each combustion chamber 38 comprises the combustor liner 34 which engages and restricts the movement of the fluid conduit 10. The combustor liner 34 may comprise a collar 36 which extends along and overlaps a portion of the outer surface 26 of the CMC cross-over tube 12. The collar 36 may also engage with the engagement surfaces 24 of the flange 14.

The combustion chamber 38 may be any component configured to ignite and direct the combustible fluid. Examples of the combustion chambers 38 may include annular combustion chambers, can combustion chambers, can-annular combustion chambers, RAM jet combustors, SCRAM jet combustors, and constant volume/pulse detonation combustors. The combustor liner 34 may be any element which defines a portion of the outer layer of the combustion chamber 38. Examples of the combustor liners 34 may include an end wall, a cylinder, and a spheroid shell. The combustor liner 34 may be made from any material sufficient to contain the thermal stress of combustion, such as a metal alloy or a ceramic matrix composite. The collar 36 may be any portion of the combustor liner 34 which extends over a portion of the CMC cross-over tube 12 and defines an opening configured to receive the fluid conduit 10. Examples of the collars 36 may include a ring, a cylinder, and a plurality of fingers.

The positions of the combustion chambers 38 may be sufficiently fixed such that the movement of the fluid conduit 10 is restrained between the two combustion chambers 38. The interaction between the flange 14 and the collar 36 may restrict the longitudinal movement of the fluid conduit 10, while the interaction between the CMC cross-over tube 12 and the collar 36 may restrict the lateral movement of the fluid conduit 10. For simplicity of construction and durability, the fluid conduit 10 may be configured such that no other structural component, such as bolts, screws, or clamps, may be coupled to the fluid conduit 10 or the combustion chambers 38 to fix the movement of the fluid conduit 10 between the combustion chambers 38. In such a configuration, the fluid conduit 10 may be free-floating between the combustion chambers 38.

Alternatively, the fluid conduit 10 may be affixed to one or both of the combustions chambers 38. For example, the engaging surface 24 of the flange 14 may be affixed to the opposing surface 60 of the liner 34 of one of the combustion chambers 38. The fluid conduit 10 may also be affixed to the liner 34 between the outer surface 26 of the shell CMC cross-over tube 12 and an inner surface 62 of the liner 34. The fluid conduit 10 may also be integral to the liner 34 of the combustion chamber 38. The fluid conduit 10 may also be affixed to the other combustion chamber 38, or the fluid conduit may remain free-floating with respect to the other combustion chamber 38.

A gap 32 between the outer surface 26 of the CMC cross-over tube 12 and the inner surface 62 of the collar 36 may exist when the combustor system 40 is under thermal loading, for example, when combustion is occurring. The CMC cross-over tube 12 may be press-fitted with the combustor liner 34 such that, when the combustor system 40 is not under thermal loading, the outer surface 26 of the CMC cross-over tube 12 contacts the inner surface 62 of the collar 36. In some embodiments, this configuration may be maintained when the combustor system 40 is under thermal loading. However, in some embodiments, thermal loading may cause the combustor liner 34 and consequently the collar 36 to retract from the outer surface 26 of the CMC cross-over tube 12. In such a configuration, the gap 32 forms between the inner surface 62 of the collar 36 and the outer surface 26 of the CMC cross-over tube 12.

The gap 32 may supplemental the flow of cooling fluid along the outer surface 26 of the CMC cross-over tube 12. However, an excessively large gap 32 may interfere with the proper function of the combustor system 40.

A gap 32 may also exist between the flange 14 and the collar 36. The collar may be press-fitted against the flange 14 such that the engagement surfaces 24 of the flange 14 contact the opposing surfaces 60 of the collar 36 when the combustor system 40 in not under thermal loading. In some embodiments, this configuration may be maintained when the combustor system 40 is under thermal loading. In some embodiments, though, the collar 36 of the combustor liner 34 may retract under thermal loading, and the gap 32 may form between the engagement surfaces 24 of the flange 14 and the opposing surfaces 60 of the collar 36.

The gap 32 may supplemental the flow of cooling fluid between the flange 14 and the collar 36. However, an excessively large gap 32 may interfere with the proper function of the combustor system 40.

Figure 5:
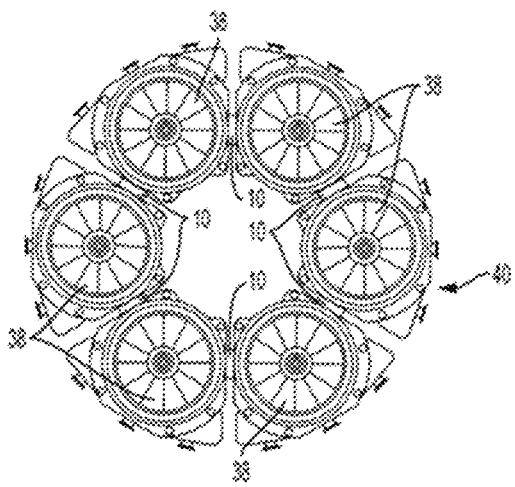
FIG. 5 illustrates a plan view of a combustor including combustion chambers and CMC cross-over tubes.

FIG. 5 illustrates an embodiment of the combustor system 40 for use within a turbine engine. The combustor system 40 illustrated in FIG. 5 comprises the combustion chambers 38 arranged in an annular pattern. Each of the combustion chambers 38 may be connected to at least two other combustion chambers 38 by a fluid conduit like the fluid conduit 10 described above. In the event that ignition occurs in one of the combustion chambers 38 but not in an adjacent combustion chamber, ignited fluid may travel through the fluid conduit 10 to aid in ignition of fuel in the adjacent combustion chamber 38. The combustion chambers 38 may be spaced so as to expose a portion of the fluid conduit 10 between each combustion chamber 38. A cooling fluid, such as compressed air, may flow over the exposed portion of the fluid conduit 10 and cool one or more components of the fluid conduit 10. For example, the cooling fluid may cool the CMC cross-over tube 12 and the flange 14.

Figure 6:
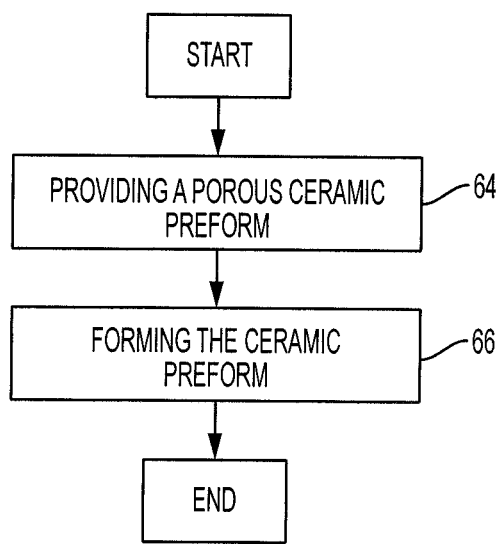
FIG. 6 illustrates a flow diagram of operations to manufacture the fluid conduit.

FIG. 6 illustrates a flow diagram of operations to manufacture a fluid conduit 10. The operations may include fewer, additional, or different operations than illustrated in FIG. 6. Alternatively or in addition, the operations may be performed in a different order than illustrated.

The CMC cross-over tube 12, and any other CMC components, may be formed in a manufacturing process. Initially, a porous ceramic preform comprising multiple ceramic fibers may be provided (64), the ceramic preform defining the approximate shape of the CMC cross-over tube 12. Examples of the ceramic fibers may include silicon carbide, carbon, mullite, zirconia, and alumina. The ceramic preform may include multiple layers of two-dimensional weave of the ceramic fibers. Alternatively or in addition, the ceramic preform may include a fiber layup, such as a unidirectional layup. In some examples, each of the ceramic fibers may be a bundle and/or tow of ceramic fibers. The fibers in each bundle or tow may be braided or otherwise arranged. In some examples, the ceramic preform may be a three-dimensional weave of ceramic fibers.

Once the ceramic preform has been provided (64), the ceramic preform is formed (66) by infiltration of a matrix material. Examples of the matrix material may include silicon carbide, alumina, or a molten alloy such as a silicon metal or other alloy. Infiltration may take place through chemical vapor infiltration (CVI), slurry infiltration, melt infiltration, or other comparable techniques. A combination of infiltration methods may be used. For example, an initial CVI may be used to coat and rigidize the ceramic fibers. Then slurry infiltration may be used with a mixture of Silicon Carbide and Carbon. Finally, melt infiltration of Silicon material may be used to complete the infiltration. In some examples, a Boron Nitrate coating may be applied to the ceramic fibers through CVI. Alternatively or in addition, a Silicon Carbide coating may be applied to the ceramic fibers. The coating of the ceramic fibers may take place before the infiltration occurs or before the ceramic fibers are arranged in a weave.

After the ceramic preform has been formed (66), in some examples, the CMC cross-over tube 12 may be machined to smooth edge and surface. Alternatively or in addition, an environmental barrier coating may be applied to the surfaces 26 of the CMC cross-over tube 12 in some examples in order to increase durability and provide for uniform thermal loading. The ceramic preform may define the passageway 16 in the CMC cross-over tube 12. The passageway 16 may be formed by placing an object such as a cylinder, a rod, or a mandrel through the ceramic preform defining the approximate shape of the CMC cross-over tube 12.

Other components, such as the flange 14 may also be manufactured by providing a second porous ceramic preform to define an approximate shape of the flange 14. The second porous ceramic preform may then be infiltrated with the matrix material as described above to form the flange 14 as a CMC component. The CMC component may, in some examples, be machined. Alternatively or in addition, an environmental barrier coating may be applied to the CMC component. In some examples, the CMC cross-over tube 12 and the flange 14 are formed as a single CMC component using a single ceramic preform.

The channels 22 may be arranged on the outer surface 26 of the CMC cross-over tube 12 (as shown in FIG. 2) and engagement surfaces 24 of the flange 14 may be incorporated into the ceramic preform during the manufacturing process of the CMC component. Alternatively or in addition, after infiltration of the matrix material has been completed, the channels 22 may be machined into the outer surface 26 of the CMC cross-over tube 12 and the engagement surfaces 24 of the flange 14 may be machined into the CMC component from which the flange 14 is formed.

In addition to the advantages that have been described, it is also possible that there are still other advantages that are not currently recognized but which may become apparent at a later time. While various embodiments have been described, it will be apparent to those of ordinary skill in the art that many more embodiments and implementations are possible. Accordingly, the embodiments described herein are examples, not the only possible embodiments and implementations.

What is claimed is:

1. A fluid conduit comprising:
   a ceramic matrix composite (CMC) cross-over tube comprising a first end configured to extend into a first combustor liner of a gas turbine engine and a second end configured to extend into a second combustor liner of the gas turbine engine, wherein an interior of the CMC cross-over tube defines a passageway, and wherein the CMC cross-over tube is longitudinally positioned about a longitudinal axis; and
   a flange extending radially away from the longitudinal axis and outwardly from an outer surface of the CMC cross-over tube, wherein the flange comprises:
      a first surface configured to engage the first combustor liner;
      a second surface configured to engage the second combustor liner;
      a radially outer edge relative to the longitudinal axis; and
      a plurality of channels comprising:
         a first channel arranged on the first surface and configured to facilitate fluid flow of fluid between the first surface and the first combustor liner from the radially outer edge to the outer surface of the CMC cross-over tube;
         a second channel arranged on the second surface and configured to facilitate fluid flow of fluid between the flange and the second combustor liner from the radially outer edge to the outer surface of the CMC cross-over tube.

2. The fluid conduit of claim 1, wherein the CMC cross-over tube and the flange are formed from a single CMC element.

3. The fluid conduit of claim 1, wherein the flange is arranged between the first end and the second end of the CMC cross-over tube.

4. The fluid conduit of claim 1, wherein the first channel arranged on the first surface is angularly offset from the second channel arranged on the second surface.

5. The fluid conduit of claim 1, wherein the cross-over tube further comprises a plurality of channels arranged on the outer surface of the CMC cross-over tube.

6. A combustor system, comprising:
   a first combustion chamber comprising a first combustor liner;
   a second combustion chamber comprising a second combustor liner;
   a ceramic matrix composite (CMC) cross-over tube having a first end and a second end, the first end extending into the first combustion chamber through the first combustor liner, the second end extending into the second combustion chamber through the second combustor liner, wherein an interior of the CMC cross-over tube defines a passageway extending from the first end to the second end, and wherein the CMC cross-over tube is longitudinally positioned about a longitudinal axis; and
   a flange extending radially from the CMC cross-over tube between the first end and the second end, wherein the flange comprises:
      a first surface configured to engage the first combustor liner;
      a second surface configured to engage the second combustor liner;
      a radially outer edge relative to the longitudinal axis; and
      a plurality of channels comprising:
         a first channel arranged on the first surface and configured to facilitate fluid flow of fluid between the first surface and the first combustor liner from the radially outer edge to the outer surface of the CMC cross-over tube; and
         a second channel arranged on the second surface and configured to facilitate fluid flow of fluid between the second surface and the second combustor liner from the radially outer edge to the outer surface of the CMC cross-over tube.

7. The combustor system of claim 6, wherein an outer surface of the CMC cross-over tube contacts an inner surface of the combustor liner.

8. The combustor system of claim 7, wherein the outer surface of the CMC cross-over tube is separated from the inner surface of the combustor liner by a gap when the combustor system is under thermal loading.

9. The combustor system of claim 6, wherein the first surface of the flange is configured to contact an opposing surface of the first combustor liner.

10. The combustor system of claim 9, wherein the first surface of the flange is configured to be separated from the opposing surface of the first combustor liner by a gap when the combustor system is under thermal loading.

11. The combustor system of claim 6, wherein the CMC cross-over tube and the flange are a single CMC element.

12. The combustor system of claim 6, wherein the first channel on the first surface is angularly offset from the second channel on the second surface.

* * * * *